United States Patent
Kim (12)

(10) Patent No.: US 6,224,989 B1
(45) Date of Patent: May 1, 2001

(54) CYLINDER BLOCK FOR AUTOMOTIVE ENGINE AND METHOD FOR FABRICATING THE SAME

(75) Inventor: Jun-su Kim, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/257,782

(22) Filed: Feb. 25, 1999

(51) Int. Cl.⁷ .............................. B32B 5/18; B32B 5/30; B22F 7/04; F02F 1/00

(52) U.S. Cl. ...................... 428/550; 428/553; 428/565; 428/567; 428/568; 123/193.2; 123/193.3; 29/888.061

(58) Field of Search ........................... 428/550, 553, 428/565, 567, 568; 123/193.2, 193.3; 29/888.061

(56) References Cited

U.S. PATENT DOCUMENTS 4,976,918 * 12/1990 Nishi et al. .
5,466,360 * 11/1995 Ehrsam et al. .
5,598,818 * 2/1997 Domanchuck .
5,829,405 * 11/1998 Godel .
5,960,762 * 10/1999 Imai .

* cited by examiner

*Primary Examiner*—Deborah Jones
*Assistant Examiner*—Jason Savage
(74) *Attorney, Agent, or Firm*—Christie, Parker & Hale, LLP

(57) ABSTRACT

A cylinder block for an automotive engine that includes a sintered cylindrical body made of a first metal, the sintered cylindrical body having a plurality of pores. A powder of a second metal is dispersed into the pores of the sintered cylindrical body, and a cylinder block body is disposed around the sintered cylindrical body while filling the pores of the sintered cylindrical body. The main body is made of a third metal and integrally formed with the sintered cylindrical body by an intemetallic compound formed by a reaction between the first, second, and third metals.

5 Claims, 3 Drawing Sheets

CYLINDER BLOCK FOR AUTOMOTIVE ENGINE AND METHOD FOR FABRICATING THE SAME

CROSS-REFERENCES TO RELATED APPLICATIONS

This application is substantially similar to Korean Patent Application No 97-44749 filed on Aug. 30, 1997, the disclosure of which is incorporated herein by reference.

FIELD OF THE INVENTION

The present invention relates to a cylinder block for an automotive engine and a method for fabricating the cylinder block.

BACKGROUND OF THE INVENTION

A cylinder block for an automotive engine is subject to cylinder wear from piston thrust. That is, piston rings sliding on a cylinder wall of the cylinder block as a piston moves up and down cause cylinder wear. Therefore, to prevent or reduce cylinder wear, as shown in FIG. 1, a replaceable cylinder liner 103 that is made of cast iron is provided on the cylinder wall of a cylinder block body 101 or, as shown in FIG. 2, a special treatment is performed on a cylinder wall of a cylinder block 201 such that the cylinder wall is impregnated with silicon 203.

However, when using the cylinder liner 103, which is simply mechanically connected with the cylinder wall, noise may occur in engine operation, and engine performance may deteriorate.

In addition, the cylinder block with the silicon-impregnated cylinder wall has the disadvantages of reduced durability and castability.

To overcome the above drawbacks, in recent years, an aluminum alloy cylinder block impregnated with a ceramic reinforcement material has been developed. However, while pouring molten aluminum alloy into a cylinder block forming mold, the mold should be in a high-pressure state, making it difficult to cast the cylinder block and increasing manufacturing costs.

SUMMARY OF THE INVENTION

The present invention has been made in an effort to solve the above-described problems.

It is an objective of the present invention to provide a cylinder block for an automotive engine that is light-weight and has good wear resistance, and can be fabricated under a reduced or no pressure state.

To achieve the above objective, the present invention provides a cylinder block for an automotive engine that includes a sintered cylindrical body made of a first metal, the sintered cylindrical body having a plurality of pores, a powder of a second metal dispersed into the pores of the sintered cylindrical body, and a cylinder block body disposed around the sintered cylindrical body while filling the pores of the sintered cylindrical body, the main body being made of a third metal and integrally formed with the sintered cylindrical body by an intemetallic compound formed by a reaction between the first, second, and third metals.

Preferably, the first metal is selected from the group consisting of Ni, Cr, Fe, and Ni-Cr alloy, the second metal is selected from the group consisting of $TiO_2$, $Cr_2O_3$, Ti, Mg, Li, and Sn, and the third metal is preferably an Al-Si-Mg alloy.

The porosity of the sintered metal body is preferably between 70–97%, and more preferably, about 80%.

A weight rate of the second metal power with respect to an entire weight of the sintered metal body dispersed with the second metal powder is preferably between 3–36 wt %, and more preferably, between about 4–22 wt %.

According to another aspect of the present invention, the above described cylinder block may be fabricated according to a method comprising the steps of preparing a sintered metal body made of a first metal material, the sintered body having a plurality of pores, dispersing powder in the pores, the powder being made of a second metal material, disposing the sintered metal body within a cylinder block forming mold, and pouring a molten metal of a third metal material in the cylinder block forming mold such that the molten metal fills the pores of the sintered meal body and forms an intermetallic compound by reacting with the powder and the sintered metal body, thereby obtaining the cylinder block.

Preferably, the method may further comprise the step of heat-treating the sintered metal body to remove impurities remaining on the sintered metal body before the step for disposing the sintered metal body in the cylinder block-forming mold.

The method may further comprise the step of heat-treating the cylinder block to adjust an amount of the intermetallic compound generated by a reaction between the sintered metal body and the molten metal.

BRIEF DESCRIPTION OF THE DRAWINGS

The accompanying drawings, which are incorporated in and constitute a part of the specification, illustrate an embodiment of the present invention, and, together with the description, serve to explain the principles of the invention.

DETAILED DESCRIPTION OF THE PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

Figure 1:
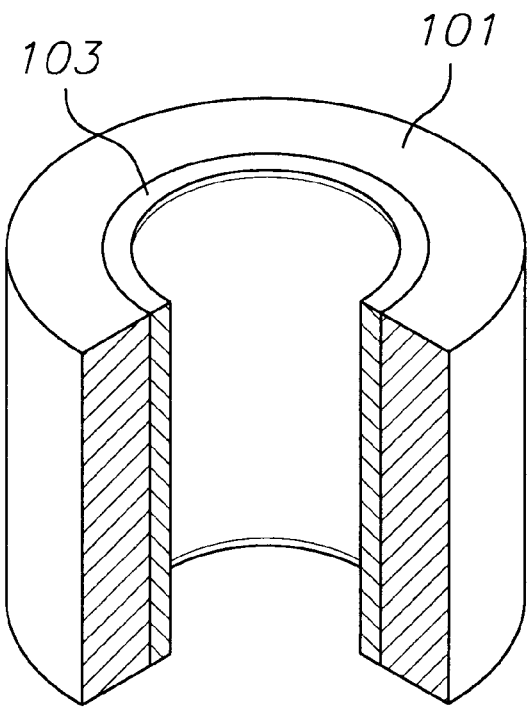
FIG. 1 is a perspective partially broken view of a conventional cylinder block with a liner.
Figure 2:
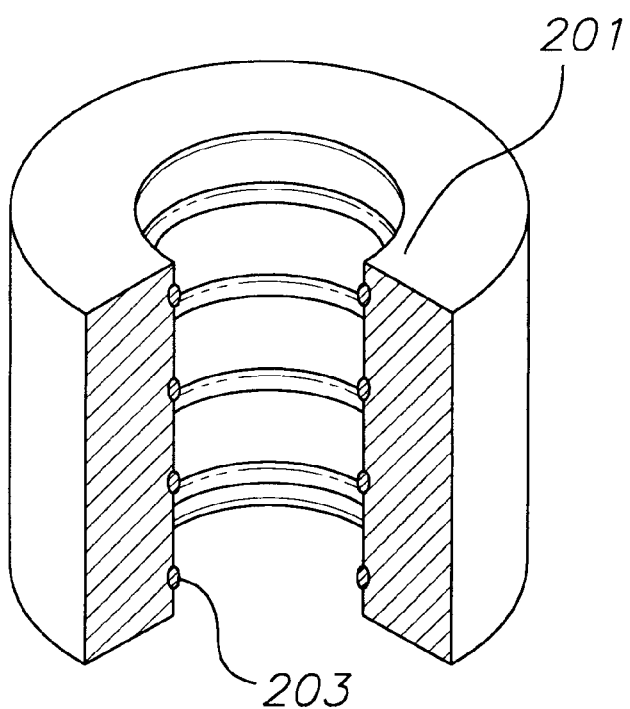
FIG. 2 is a perspective view of another conventional cylinder block in which a cylinder wall is impregnated with silicon through an alusil process.
Figure 3:
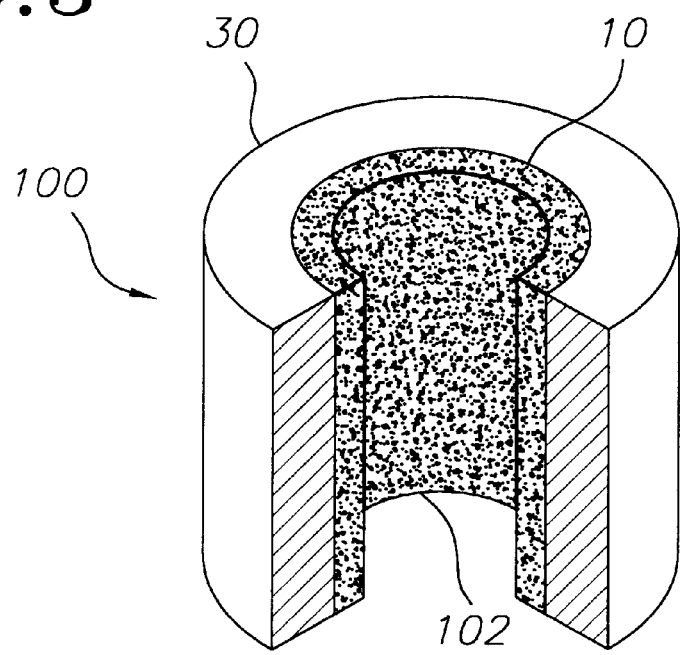
FIG. 3 is a perspective partially broken view of a cylinder block according to a preferred embodiment of the present invention.

FIG. 3 shows a cylinder block according to a preferred embodiment of the present invention.

A cylinder block 100 according to the present invention includes a cylinder portion 10 formed of a sintered metal body having a plurality of pores and defining a cylinder wall 102 on which a piston (not shown) moves up-and-down, a cylinder block body 30 disposed around the cylinder portion 10 while partially filling in the pores of the sintered metal body of the cylinder portion 10. The cylinder portion 10 is made of a first metal material, and the cylinder block body 30 is made of a second metal material that can react with the first metal material to make an intermetallic composition. The cylinder block body 30 is integrally combined with the cylinder portion 10 by the second metal material filling in pores of the sintered metal body of the cylinder portion 10 and reacting with the first metal material to form an intermetallic composition therebetween. Preferably, powder made of a third metal material is dispersed in the pores of the sintered metal body so as to enhance the reaction between the first and second metal materials. The intermetallic composition has relatively high wear resistance, providing higher durability to the cylinder block.

In this embodiment, the first metal material is selected from a group consisting of Ni, Cr, Fe, and Ni-Cr alloy, the second metal material is selected from the group consisting of $TiO_2$, $Cr_2O_3$, Ti, Mg, Li, and Sn and the third metal material is an Al-Si-Mg alloy.

Figure 4:
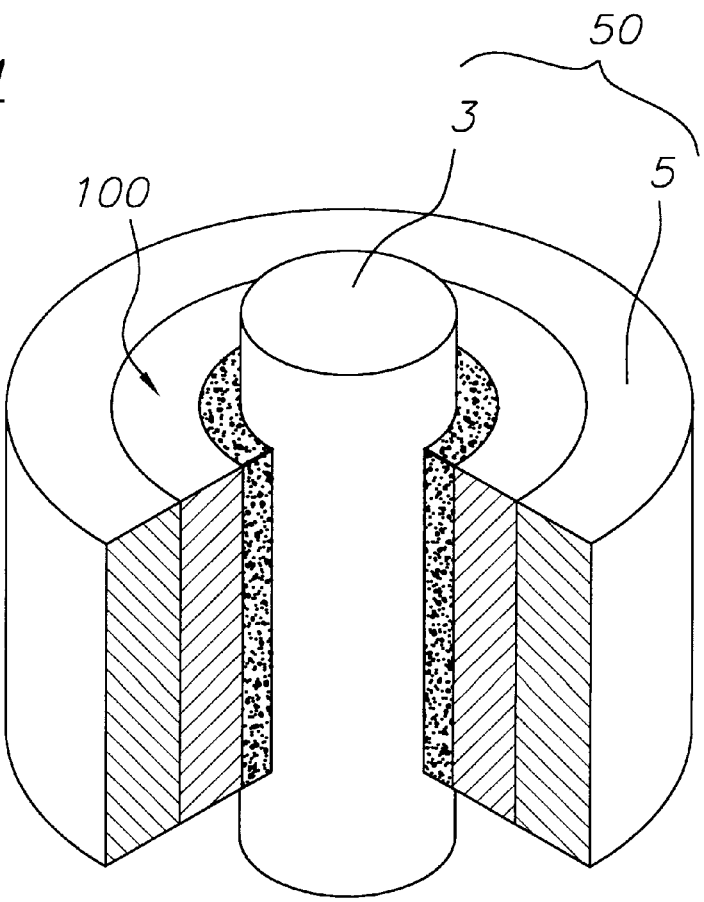
FIG. 4 is a perspective view illustrating a casting method of a cylinder block according to a preferred embodiment of the present invention.
Figure 5:
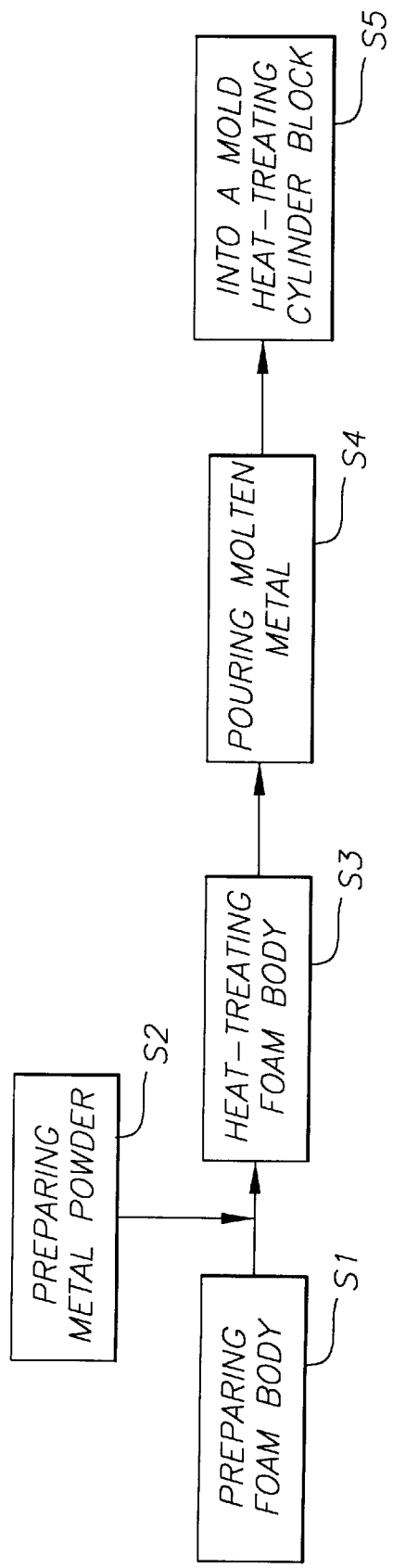
FIG. 5 is a block diagram of a method for fabricating a cylinder block, according to a preferred embodiment of the present invention.

FIGS. 4 and 5 illustrate a method for fabricating the above-described present cylinder block according to a preferred embodiment of the present invention.

Referring first to FIG. 5, a sintered metal body made of, for example, Ni, Ni-Cr alloy, Cr, or Fe is first prepared (S1), the sintered metal body being cylindrical-shaped, then oxide metal powder such $TiO_2$ and $Cr_2O_3$ or transition metal powder such as Mg and Ti is dispersed in pores of the sintered metal body (S2). Next, the sintered metal body is heat-treated at a temperature of about 150° C. to remove impurities such as moisture remaining on the sintered metal body (S3), then as shown in FIG. 4, disposed within in a cylinder block-forming mold 50 comprising an inner mold 3 and an outer mold 5 (i.e., disposed around the inner mold 3). Molten metal of an Al-Si-Mg alloy is poured into the cylinder block forming mold 50 (S4). While the molten metal is poured into the cylinder block forming mold 50 in which the sintered metal body is disposed, a rapid exothermic reaction between the molten metal and the metal powder filled the sintered metal body causes the molten metal to react with the sintered metal body. For example, when Ti is used for the metal powder and Al is used for the molten metal, exothermic reactions occur as follows:

$7Al + 3TiO_2 \rightarrow 2Al_2O_3 + 3TiAl$  H1

$5Al + 3TiO_2 \rightarrow 2Al_2O_3 + 3TiAl$  H2

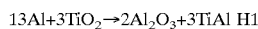
$13Al + 3TiO_2 \rightarrow 2Al_2O_3 + 3TiAl$  H1

Due to the calorific values generated during the above described reactions, the molten metal reacts with the sintered metal body, thereby forming an intermetallic compound such as a Ni-Al intermetallic compound, which has high wear resistance, between the molten metal and the sintered metal body 10. In this embodiment, after completing the pouring of the molten metal, a heat-treatment process can be further performed (S5) to enhance the generation of the intermetallic compound. The sintered metal body 10 is formed having a porosity of between 70–95%, and preferably, 80%. If the porosity is higher than 95%, an amount of the intermetallic compound becomes too low to obtain a cylinder block having sufficient wear resistance, whereas if the porosity is less than 70%, the molten metal is not easily infiltrated into the sintered metal body during the pouring process of the molten metal. Furthermore, if too much of the intermetallic compound is generated, the mechanical characteristics of a resultant cylinder block deteriorate.

In addition, when filling the sintered metal body 10 with the metal powder, a weight rate of the metal powder with respect to an entire weight of the sintered metal body dispersed with the metal powder is preferably within a range of 3–35 wt %, preferably between 4–22 wt %. If the weight rate is less than 3 wt %, the chemical reactivity between the sintered metal body 10 and the molten metal is reduced, the molten metal is not effectively infiltrated in the sintered metal body. On the other hand, if the weight rate is above 35 wt %, an excessive exothermic reaction between the molten metal and the metal powder occurs. This may cause the sintered metal body to melt or become deformed.

In this embodiment, the molten metal is heated to about 690–720° C. and poured into the cylinder block forming mold 50 either under a no pressure state or a reduced pressure state. If the temperature of the molten metal is higher than 720° C., the sintered metal body may melt, and if less than 690° C., casting of the cylinder block may not be effectively performed. In addition, the rapid exothermic reaction occurring between the molten metal and the metal powder when pouring the molten metal into the mold causes the interfacial energy between the molten metal and the sintered metal body to reduce, while increasing the wettability between the molten metal and the sintered metal body. This allows the molten metal to be infiltrated into the sintered metal body under a no pressure or a reduced-pressure state.

The heat-treatment process (S5) for enhancing the generation of the intermetallic compound is conducted at a temperature from 500° C. to 550° C., and preferably from 510 to 530° C. At a temperature less than 500° C., the heating time is overly extended; and at temperature higher than 550° C., the shape of the cylinder block may become deformed by force of gravity.

In addition, since the wear resistance of the cylinder block depends on the amount of the intermetallic compound, and the amount of the intermetallic compound depends on a temperature of the heat-treatment and a time for the heat-treatment, by adjusting the heat-treatment temperature and time, an optimal cylinder block can be obtained.

EXAMPLE

Example cylinder blocks were made according to the above-described method. Ni, Ti, and Al were used for the sintered metal body, the metal powder and the molten metal, respectively.

An example cylinder block I was not heat-treated after being cast, while the second, third, and fourth cylinder blocks II, III, and IV were heat-treated at a temperature of 520° C. for 6 hours, 12 hours, and 18 hours, respectively.

Table (1) below shows a comparison between the first to fourth cylinder blocks and conventional cylinder blocks C1 and C2 made of AC2B aluminum alloy and cast iron, respectively.

TABLE 1

| Cylinder blocks | Hardness (Brinell) | Amount of wear(g) | Frictional coefficient |
| --- | --- | --- | --- |
| C1 | 98 | 84 | 0.68 |
| C2 | 180 | 32 | 0.46 |
| Example I | 170 | 32 | 0.40 |
| Example II | 200 | 28 | 0.39 |
| Example III | 252 | 23 | 0.37 |
| Example IV | 278 | 20 | 0.38 |

Aa shown in the table (1), the hardness of the cylinder blocks made according to the present invention is higher than that of the conventional cylinder blocks, whereas the amount of wear and a frictional coefficient are less than those of the conventional cylinder blocks. Accordingly, there is no need for providing an additional liner on an inner circumference of the cylinder blocks.

In addition, as an amount of the intermetallic compound can be altered by adjusting the time for heat-treatment, a cylinder block having suitable wear resistance and surface hardness can be obtained.

Furthermore, since the rapid exothermic reaction occurring between the molten metal and the metal powder when pouring the molten metal into the mold causes the interfacial energy between the molten metal and the sintered metal body to reduce, while increasing wettability between the molten metal and the sintered metal body, the molten metal can be easily infiltrated into the sintered metal body under a no pressure state or a reduced-pressure state, simplifying the manufacturing process and reducing manufacturing costs.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A cylinder block for an automotive engine, comprising:
    a sintered cylindrical body made of a first metal selected from the group consisting of Ni, Cr, Fe, and Ni-Cr alloy, the sintered cylindrical body having a plurality of pores;
    a powder of a second metal or metal oxide selected from the group consisting of $TiO_2$, $Cr_2O_3$, Mg, Ti, and Li dispersed into the pores of the sintered cylindrical body; and
    a cylinder block body disposed around the sintered cylindrical body while filling the pores of the sintered cylindrical body, the main body being made of a third metal comprising an Al-Si-Mg alloy and integrally formed with the sintered cylindrical body by an intermetallic compound by a reaction between the first metal, second metal and/or metal oxide, and third metal.

2. The cylinder block of claim 1 wherein a porosity of the sintered metal body is between 70–97%.

3. The cylinder block of claim 1 wherein a porosity of the sintered metal body is about 80%.

4. The cylinder block of claim 1 wherein the weight ratio of the second metal or metal oxide powder with respect to the entire weight of the sintered metal body dispersed with second metal or metal oxide powder is from 3 to 36 wt %.

5. The cylinder block of claim 1 wherein the weight ratio of the second metal or metal oxide powder with respect to the entire weight of the sintered metal body dispersed with the second metal or metal oxide powder is from about 4 to 12 wt %.

* * * * *